United States Patent [19]

Furst et al.

[11] Patent Number: 4,630,637

[45] Date of Patent: Dec. 23, 1986

[54] GAS FLOW REGULATOR FOR GASES WITH CONDENSABLE COMPONENTS

[75] Inventors: Leander Furst, Jülich, Fed. Rep. of Germany; Johan T. G. Ballast, Veenendaal, Netherlands; Kurt Jahnel, Düsseldorf-Itter, Fed. Rep. of Germany

[73] Assignees: Kernforschungsanlage Julich GmbH, Julich; Brooks Instrument, Zweigniederlassung Elmshorn der Emerson Electric GmbH, Elmshorn, both of Fed. Rep. of Germany

[21] Appl. No.: 775,736

[22] Filed: Sep. 13, 1985

[30] Foreign Application Priority Data

Sep. 15, 1984 [DE] Fed. Rep. of Germany ....... 3434024

[51] Int. Cl.$^4$ ............................................. F16K 49/00
[52] U.S. Cl. .................................... 137/340; 137/375; 137/613; 204/409
[58] Field of Search ............ 137/13, 340, 375, 505.42, 137/613; 251/121; 165/110; 204/408, 409, 415

[56] References Cited

U.S. PATENT DOCUMENTS

| | | | |
|---|---|---|---|
| 1,003,916 | 9/1911 | Koenig | 137/505.42 |
| 1,256,229 | 2/1918 | Hills | 165/110 |
| 1,451,242 | 4/1923 | Viberg | 137/375 |
| 2,647,823 | 8/1953 | Van Wessem et al. | 165/110 |
| 2,831,756 | 4/1958 | Miles et al. | 137/505.42 |
| 3,198,001 | 8/1965 | Ferrin | 137/375 |
| 3,432,418 | 3/1969 | Kleiss | 204/408 |
| 4,392,509 | 7/1983 | Siddall | 137/340 |
| 4,449,554 | 5/1984 | Busse | 137/375 |
| 4,532,023 | 7/1985 | Fürst et al. | 204/409 |

FOREIGN PATENT DOCUMENTS

| | | |
|---|---|---|
| 1656212 | 5/1953 | Fed. Rep. of Germany . |
| 2334348 | 1/1975 | Fed. Rep. of Germany . |
| 2349084 | 4/1976 | France . |

Primary Examiner—A. Michael Chambers
Assistant Examiner—Sheri M. Novack
Attorney, Agent, or Firm—Karl F. Ross; Herbert Dubno

[57] ABSTRACT

A gas flow regulator for gases with condensable components, which delivers gases at constant pressure with constant average composition comprising a gas flow control mechanism, preferably including a spring-loaded membrane bounding a receiving chamber, which is subjected to the pressure of the gases flowing in and which an inlet valve control; and a cooling section connected and vertically oriented to the gas flow control mechanism by which the proportions of the condensable components are held at a partial pressure given by the cooling temperature, and a means for maintaining the gas flow control mechanism at a temperature above the condensation point. A restrictor, preferably an adjustable outlet valve, is connected after the cooling section to help maintain the membrane under pressure by the flowing gas, from which all condensate formed arrives in the region below the regulator directly by action of the force of gravity.

8 Claims, 2 Drawing Figures

GAS FLOW REGULATOR FOR GASES WITH CONDENSABLE COMPONENTS

FIELD OF THE INVENTION

Our present invention relates to a gas flow regulator for controlling the flow of a gas under pressure and, more particularly, to a gas flow regulator for controlling the flow of a gas containing a condensable component.

BACKGROUND OF THE INVENTION

A prior art gas flow regulator can comprise a gas flow control mechanism, including a spring-loaded membrane bounding a gas-receiving chamber, which is subjected to the pressure of the input gas, and a flow-control valve connected to the membrane and a restrictor or constriction at the outlet of the gas flow regulator. The constriction and the force of the spring can be controllable.

For the regulation of the flow rate of liquids and gases a membrane flow regulator of this type is known, in which the outlet flow of an adjustable valve is controlled by an adjustable spring-loaded flexible membrane so that with increased fluid input the output cross section of the valve is reduced. This membrane bounds a space in which the fluid arrives through the adjustable valve and which is connected with a restrictor, through which the fluid flows.

One such regulator, for example, is taught in German utility model DE-GM No. 16 56 212, in which a reducing valve is provided as a restrictor, leading to a flow meter connected to it after the principal flow element and to the outflow side of the space over the membrane. With this additional mechanism the flow adjustment precision is improved.

A similar regulator is described in German patent document DE-OS No. 21 55 323, which to be sure has no flow meter. Another membrane flow regulator of the above type is described in German patent document DE-OS No. 23 34 348 in which a pressure surge is attenuated by a compensating member, particularly in the form of an attenuating piston, subjected to the inlet-side pressure and passing through the membrane.

Finally, in French patent document No. 23 49 084, a membrane flow regulator is taught, in which the spring acting on the membrane is formed as a kind of leaf spring and a plunger or push rod shaped connecting body engaged by the membrane acts on the regulating valve. On the outlet side a fine orifice is provided as a restrictor, after which a by-pass to the space adjacent the membrane branches off. This regulator is suitable for regulation of very slight flow rates in low pressure flows.

All these known regulators employed as gas flow meters presuppose gases, which do not change their composition during the regulating process, for example, do not condense out or have components which condense out since on the other hand the functioning of the regulating process would be disturbed by the condensate formed by the condensation process. Furthermore, because of the condensation irregular variation of undetermined components in the mixture could occur, which would be a particular problem for gas flows with nonuniform gas compositions.

OBJECTS OF THE INVENTION

The aim of our invention is, therefore, the development of a gas flow regulator of the above-described kind, from which instead of varying portions of the condensable and condensate soluble components of the inflowing gases a constant gas flow with uniform pressure is delivered and all condensate formed preferably directly with the gas, from which it condenses, reaches a subsequent region so that the proportions of it correspond substantially to those of the original gas composition.

It is an object of our invention to provide an improved gas flow regulator for gases with condensable components.

It is also an object of our invention to provide an improved has regulator for gases with condensable components which delivers an output flow in which the proportions of the components, condensable and noncondensable, are substantially the same as those of the original mixture.

It is a further object of our invention to provide an improved gas regulator for gases with condensable components, which provides a constant gas flow with a uniform pressure with substantially no variations in average gas composition.

It is also an object of the invention to obviate disadvantages of the prior art.

SUMMARY OF THE INVENTION

These objects and others, which will become more apparent hereinafter, are attained in accordance with our invention in a gas flow regulator for gases with condensable components comprising a gas flow control mechanism, preferably including a spring-loaded membrane bounding a gas-receiving chamber which is subjected to the pressure of the input gas, a controlling inlet valve connected to the membrane, and a restrictor or constriction at the outlet of the gas flow regulator.

According to our invention for the condensation of the condensable components a cooled cooling section is provided substantially vertically between the gas flow control mechanism, or preferably the gas-receiving chamber, and the restrictor, from which all condensate formed directly reaches the region underneath the mechanism by the action of the force of gravity.

In a preferred embodiment of our invention the restrictor is an adjustable outlet valve.

For avoidance of undesired condensation the structural components upstream of the cooling section must be held at a temperature over the condensation point or dewpoint for the gas mixture. Therefore a means for maintaining the temperature of the gas flow control mechanism above the condensation point is provided. This means can include a housing or layer of thermal insulation.

With this arrangement constant pressure and composition gases are delivered, wherein the condensate formed with soluble components practically without delay is transported by gravity and entrainment in a fluid mixture with the gas, and reaches the directly connected subsequent region, for example, reaches an analyzer.

In a preferred embodiment of our invention the cooling section is provided with a cooling jacket through which a coolant may be circulated.

A gas flow regulator of the present type is needed particularly in connection with a polarographic analyzer for determination of $SO_2$ in gases, e.g. furnace, stacks or flue gases which has an internally driven electrolytic circulation according to the gas lift or MAMMUT pump principle. Polarographic analyzers react sensitively to all changes in the surroundings. A particularly important requirement, which maintains the internal electrolyte circulation constant, is that the cell must be provided with constant input gas flow rates at constant pressure.

In a preferred embodiment of our invention coupled to a polaragraphic analyzer, the cooling of the cooling section is provided by the polarographic analyzer. Preferably the electrolyte used in the polarograph can be circulated through a cooling jacket for the cooling section.

Gas mixtures, particularly smoke from chimneys, whose analysis and observation is a particular application for our invention, contain various proportions of water vapor, whose condensation leads to variations of the noncondensable residual gas flow, which is responsible for the electrolyte circulation.

We cannot, to meet this problem, provide a cooling section before the gas flow regulator, as thus uncontrolable amounts of the sulfur dioxide in the composition would be eliminated on account of the solubility of sulfur dioxide in water condensed in such a cooling section.

Also the regulator apparatus cannot be connected to the outlet of the analyzer components, since the gas pressure behind the analyzer, which operates near atmospheric pressure is not sufficient for the functioning of the regulator.

Although the gas flow regulator was especially developed for the operation of a polarographic $SO_2$ analyzer with electrolytic circulation (as described in German patent application P 33 08 888.8-1) and the present description mostly refers to this purpose, we wish to make clear that the arrangement according to our invention is applicable for every system with condensable components, e.g. for the regulation of gases containing vapors of condensable organic solvents.

In a preferred embodiment of our invention, particularly useful for polarographic analysis, the cooling section is a cooling pipe with an inner diameter of from substantially 5 to 15 mm and a length from 5 to 15 cm.

BRIEF DESCRIPTION OF THE DRAWING

The above and other objects, features and advantages of our invention will become more readily apparent from the following description, reference being made to the accompanying drawing in which.

SPECIFIC DESCRIPTION

Figure 1:
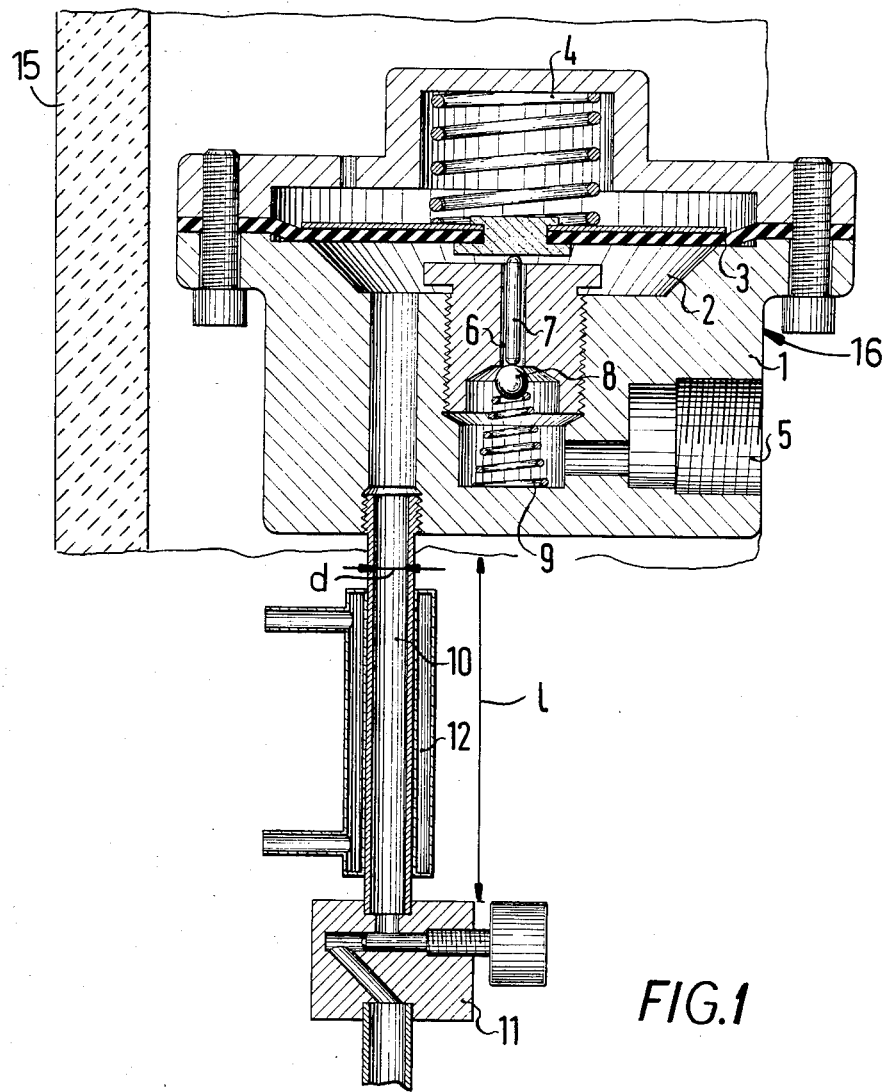
FIG. 1 is a cross sectional view of a preferred embodiment of the gas flow regulator according to our invention.

The gas flow regulator shown in FIG. 1 comprises a housing 1 having a gas-receiving chamber 2, which is bounded by a membrane 3, against which a spring 4 acts.

This membrane 3 adjusts to the pressure of the gases flowing in the gas inlet 5 and controls the size of the passage opening 14 for the gas flow by the valve mechanism comprising passage 6, push rod 7, ball 8 and spring 9.

A cooling section 10 (electrolyte-traversed liquid jacket condenser) is attached directly to the preferably disk-shaped gas-receiving chamber 2, and is so dimensioned that the partial pressure of the condensable components is maintained at the vapor pressure corresponding to the temperature of the cooling section.

A restrictor in the form of a regulating or adjustable outlet valve 11 necessary for keeping the membrane 3 under pressure is connected to the cooling section 10. Instead of the regulating or adjustable outlet valve 11, a capillary tube or an arbitrary constriction can be provided. The cooling section or condenser section 10 has a cooling jacket 12, which particularly is included in the electrolytic circulation path of an $SO_2$ polarographic analyzer.

The housing 1, the gas-receiving chamber 2, the membrane 3 with the spring 4, the gas inlet 5, the passage 6, push rod 7, ball 8 and spring 9 together may be considered as a gas flow control mechanism 16 of the gas flow regulator. The gas flow control mechanism 16 requires a means 15 (e.g. a layer of insulation or heating bandage) by which its temperature is maintained above the temperature at which condensation occurs in the input gases.

The cooling section 10 may advantageously be a perpendicular cooling pipe 10 with an inner diameter d, of from substantially 5 to 15 mm and a length l from 5 to 15 cm.

Figure 2:
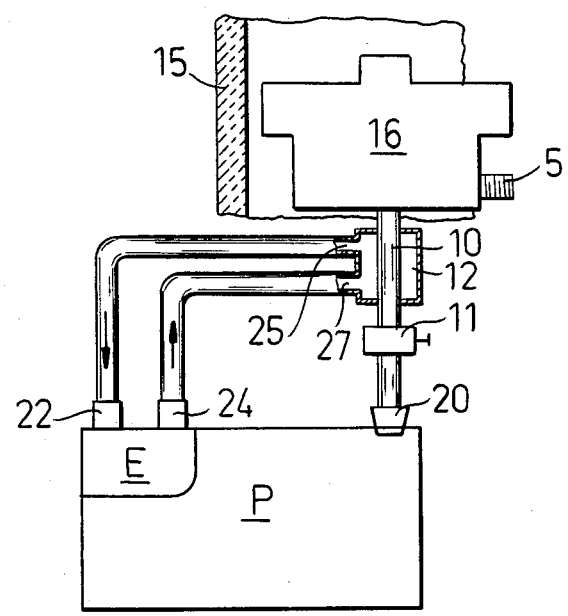
FIG. 2 is a plan view of a gas flow regulator according to our invention coupled to a polarographic analyzer.

In FIG. 2 the gas flow regulator is shown coupled to a polarographic analyzer. In this example the coolant used by the cooling jacket 12 is provided by the electrolyte found in the electrolyte reservoir E of the polarograph P. This electrolyte reservoir E has an outlet 24 connected to the inlet 27 of the jacket 12 of the cooling section 10 and an inlet 22 connected to the outlet 25 of the jacket 12. The polarograph P is of a standard design and the electrolyte can be circulated by gas entrainment with the admitted has using gas-lift or MAMMUT pum principles.

We claim:

1. In a gas flow regulator for a gas with a condensable component comprising a spring-loaded membrane bounding a gas-receiving chamber, said spring-loaded membrane being subjected to the pressure of said gases, a controlling inlet valve positioned adjacent said membrane and a restrictor positioned downstream from said chamber constricting flow of said gas, the improvement which comprises for the condensation of said condensable component a cooled cooling section positioned substantially vertically and connected between said gas-receiving chamber and said restrictor, from which all condensate formed directly reaches by the action of the force of gravity the region underneath a gas flow regulator mechanism formed by said chamber, membrane and inlet valve.

2. In a gas regulator according to claim 1 connected with an electrolytic circulation polarographic analyzer having recycling of the electrolyte over an electrolyte cleaning path, the improvement wherein the cooling of said cooling section is provided by said electrolytic circulation of said polarographic analyzer.

3. The improvement according to claim 2 wherein said cooling section is formed by a cooling pipe with an inner diameter of from substantially 5 to 15 mm and a length from 5 to 15 cm, said cooling pipe being perpendicular to said membrane.

4. The improvement defined in claim 1, further comprising means for maintaining the temperature of said mechanism above the dewpoint of said component of said gas.

5. In a gas flow regulator for a gas with condensable components comprising a gas flow control mechanism delivering said gas to a restrictor positioned before an outlet of said gas flow regulator, the improvement wherein a means for maintaining said gas flow control mechanism at a temperature above said condensation point of said gas is provided and a cooled cooling section is positioned and connected vertically between said gas flow control mechanism and said restrictor, from which all condensate formed directly reaches the region after said restrictor by action of the force of gravity.

6. The improvement according to claim 5 wherein said restrictor comprises an adjustable outlet valve.

7. The improvement according to claim 5 wherein said gas flow control mechanism comprises a spring-loaded membrane bounding a gas-receiving chamber.

8. The improvement according to claim 5 wherein said cooling section is equipped with a cooling jacket.

* * * * *